July 21, 1959  J. R. WALD, JR., ET AL  2,895,647
HIGHWAY MARKING APPARATUS AND METHOD
Filed Nov. 15, 1956  2 Sheets-Sheet 1

INVENTORS
JOHN R. WALD, JR.
RUFUS W. WILSON

BY Karl W. Flocks

ATTORNEY

July 21, 1959 J. R. WALD, JR., ET AL 2,895,647
HIGHWAY MARKING APPARATUS AND METHOD
Filed Nov. 15, 1956 2 Sheets-Sheet 2
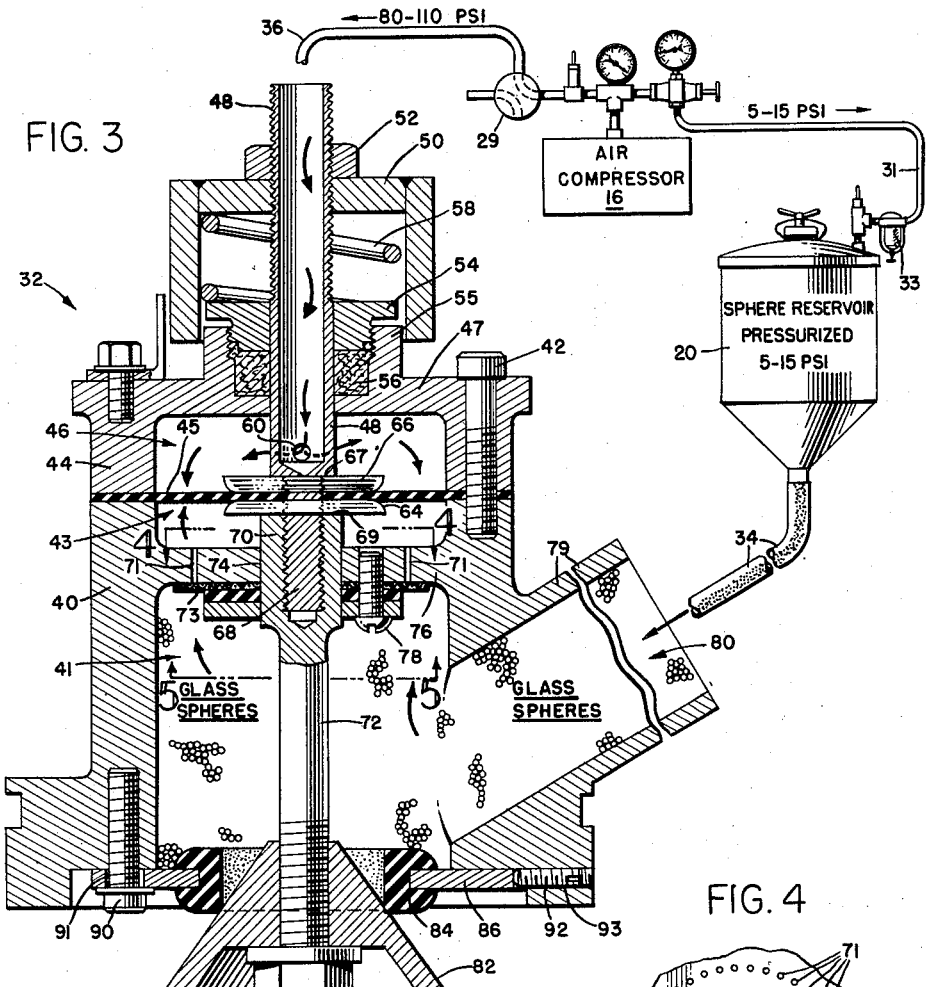
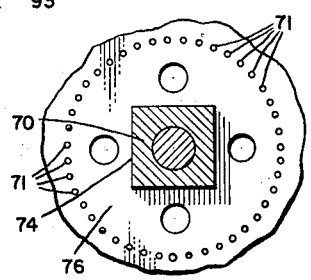
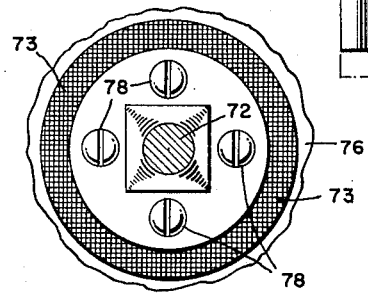
INVENTORS
JOHN R. WALD, JR.
RUFUS W. WILSON
BY Karl W. Flocks
ATTORNEY

United States Patent Office 2,895,647
Patented July 21, 1959

2,895,647

HIGHWAY MARKING APPARATUS AND METHOD

John R. Wald, Jr., and Rufus W. Wilson, Huntingdon, Pa., assignors to Wald Industries, Inc., Huntingdon, Pa., a corporation of Pennsylvania Application November 15, 1956, Serial No. 622,309

14 Claims. (Cl. 222—189)

The present invention relates to highway marking apparatus. More particularly, the present invention relates to a glass bead dispenser that is adapted to convey glass beads from a container and uniformly distribute the glass beads or spheres on a freshly applied roadway marking, thereby forming a reflectorized traffic stripe on the roadway.

In the application of traffic lines to highways, it is generally desirable to apply a reflectorized material in the form of small glass spheres or beads to the highway stripe for increasing night-time visibility and further extending the life of the stripe. The small glass beads may be applied with the paint binder in a single operation or an alternative method of application is to apply the paint binder separately and then immediately follow the paint binder with an application of the small glass beads which are dispensed by gravity flow thereon.

Prior to the instant invention, the heretofore known striping apparatus for individually applying the paint binder and glass beads has either been of the self-propelled variety or that type of machine connected to a towing vehicle. The bead dispenser was normally mounted on the striping machine so that it was positioned rearwardly of the paint gun with respect to the direction of travel and was fed by a glass bead reservoir positioned at an elevated location directly over said dispenser to permit feeding of the beads by gravity from the reservoir to the dispenser. Thus, a paint line was applied to the surface to be marked and the beads were then applied directly on the freshly painted line or stripe. In order to uniformly distribute the glass beads on the paint stripe, it has been necessary to position the glass bead reservoir directly above the dispenser within a confined scope due to the steep "angle of repose" of the small glass spheres having a maximum diameter of approximately .030 inch. Due to moisture from the atmosphere, there is a tendency for the beads to stick together, although even when dry the spheres pack tightly from their own accumulated weight when confined in a container. Further difficulties have been experienced in the past with the use of gravity flow, particularly when non-metallic tubes or conductors are utilized to convey the beads from the container to the dispenser. When rubber conductors are used, friction causes the spheres to pack. These difficulties present problems that make it necessary to provide very steep angles in the feed lines to gravitate the spheres. Under normal operation conditions at angles of 50° or less from horizontal, the glass spheres will not flow freely through the feed lines.

It is therefore an object of the present invention to provide glass bead dispensing apparatus that is adapted to eliminate the need for steep angles in the feed lines from the reservoir to the dispenser.

Another object of the present invention is to provide a glass bead dispenser that is adapted to be mounted on a striping machine that prevents packing of the glass beads in the feed lines.

Still another object of the present invention is to provide a glass bead dispenser which incorporates a novel diaphragm controlled valve.

Still another object of the present invention is to provide a diaphragm controlled valve for controlling the dispensing of the glass beads that is quicker acting and more efficient.

Still another object of the present invention is to provide a glass bead dispensing method and apparatus that is adapted to distribute glass beads at a uniform rate and with a uniform distribution thereof on the surface being marked.

Other objects and the nature and advantages of the instant invention will be apparent from the following description taken in conjunction with the accompanying drawings, wherein:

Fig. 3 is a vertical sectional view of the bead dispenser taken along the line 3—3 of Fig. 2;

Fig. 4 is a sectional view taken along the line 4—4 of Fig. 3; and

Fig. 5 is a sectional view taken along the line 5—5 of Fig. 3.

It has now been found that by introducing dry air under a low pressure greater than atmospheric into the glass bead reservoir the glass beads can be pressurized and successfully conveyed in this manner through feed lines from the reservoir to the dispensing device. In this manner, the reservoir need not be located directly above the dispensing device since the spheres can now be readily conveyed through long horizontal and vertically inclined runs with ease. It has likewise now been found that this lower air pressure can be utilized in the operation of the diaphragm controlled valve to improve its action.

Figure 1:
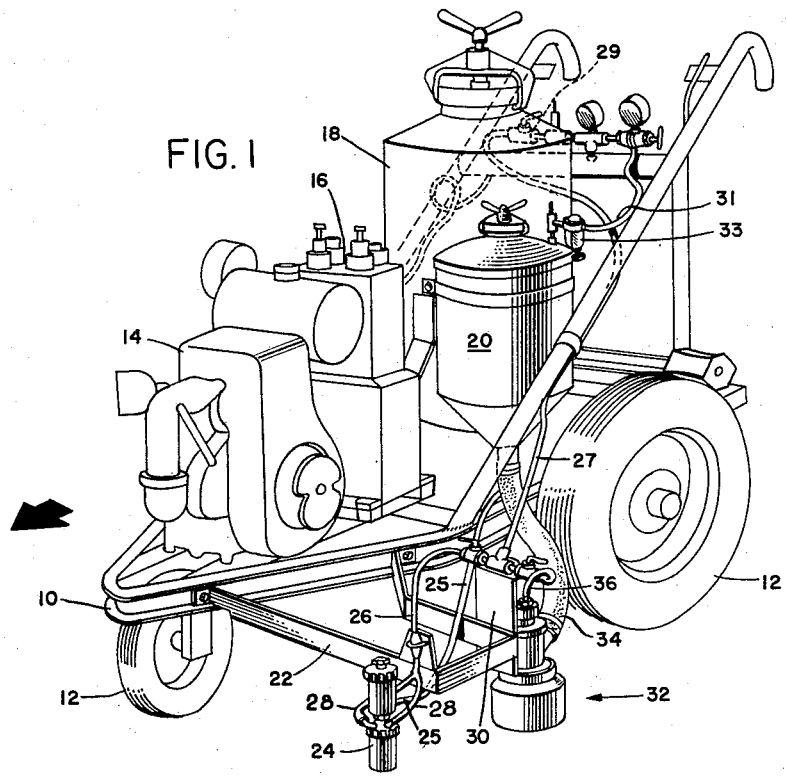
Fig. 1 is a perspective view of a highway marking machine of the self-propelled type, illustrating the location of the bead dispensing apparatus embodied in the present invention mounted thereon.

Referring now to the drawings, and particularly Fig. 1, a highway marking machine of the self-propelled type is illustrated and includes a frame 10 upon which wheels 12 are rotatably mounted at the front and rear thereof. The marking machine may be of the tri-wheeled type, a small wheel being positioned at the front thereof, and the operator may either walk behind the machine or ride on a rear platform mounted on the rear thereof. Also mounted on the frame 10 is an internal combustion engine 14 for supplying the operating power for the machine and a compressor 16 driven by the engine 14 for supplying the operating air for the dispensing equipment. Mounted rearwardly of the engine 14 and compressor 16 on suitable supports secured to the frame 10 is a receptacle 18 which contains the paint binder. A reservoir 20 is located adjacent the container 18 and contains a supply of small light reflecting beads of glass. Extending outwardly from the frame 10 and secured thereto is a sub-frame assembly 22 that has mounted thereon a paint gun 24. The paint gun 24 communicates with the paint container 18 through a paint conducting conduit 25. The paint gun 24 further communicates with a source of air pressure through lines 26 and 28 which are operatively connected to a flexible air supply hose 27 through a T coupling. The air supply hose 27 is connected to a suitable three-way air control valve 29 within easy reach of the operator. Secured to the sub-frame assembly 22 by a clamping bracket 30 is a glass bead dispenser, generally indicated at 32. The bead dispenser 32 is positioned directly behind the paint gun 24 and is adapted to distribute a uniform supply of glass beads onto the freshly applied paint stripe during the striping operation. The bead dispenser 32 is continuously supplied with the glass beads and for this purpose communicates with the bead reservoir 20 through a flexible conduit 34. The bead dispenser is adapted to be air-operated for instantaneous control, as will be described hereinafter, and further communicates with a source of air pressure through an air line 36 operatively connected thereto, the air line 36 communicating with the flexible air hose 27 through the T coupling.

It is understood that the operator of the striping machine controls the operation thereof so that the machine is propelled along the road to be marked at a relatively low rate of speed, the direction of travel being in the direction of the arrow shown in Fig. 1. As the machine moves along the surface of the road, the paint gun 24 applies a paint stripe thereon and immediately thereafter glass beads are dispensed by the bead dispenser 32 on the freshly applied paint stripe.

Figure 2:
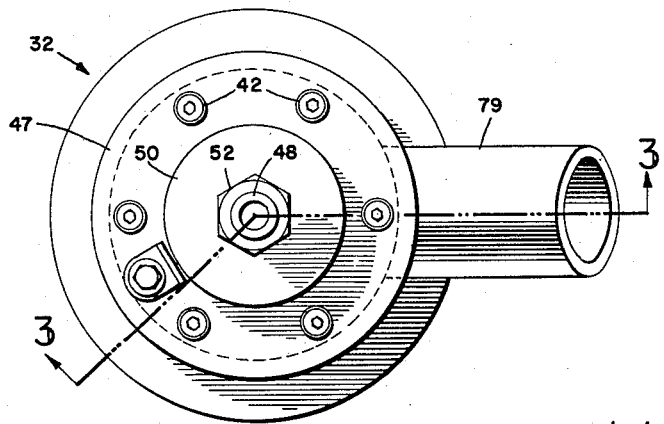
Fig. 2 is a top plan view of the bead dispenser embodied herein and shown particularly in Fig. 3.

Referring now to Figs. 2–4, the glass bead dispensing apparatus embodied in the present invention is illustrated. An air supply hose 31 conducts a supply of air under a lower pressure of approximately 5 to 15 p.s.i. through an air filter 33 and thence into the sphere reservoir 20. The glass beads are pressurized by the air and flow freely through the system. The dispenser includes a central housing 40 that has a valve chamber 41 formed therein. Mounted on the central housing 40 and secured thereto by suitable bolts 42 is an upper housing 44. Between the central housing 40 and the upper housing 44 is positioned a diaphragm 45, the operation of which will be described hereinafter. The diaphragm 45 cooperates with the upper housing 44 to define an upper diaphragm chamber 46 which is adapted to receive operating air therein for causing movement of the diaphragm 45. Extending into the upper chamber 46 through an opening formed in the upper housing wall 47 is a hollow shaft 48 that is connected to the air line 36. As described above, the air line 36 is connected to a source of higher air pressure of approximately 80–110 p.s.i. that supplies the air for operating the bead dispenser. The hollow shaft 48 is secured to a movable cup member 50 by an adjustment nut 52 and extends through an inner gland nut 54. The inner gland nut 54 is threadedly mounted in neck portion 55 that is integrally formed on the upper housing wall 47. The gland nut 54 engages a packing assembly 56 that is seated within the neck portion 55 and that further engages the shaft 48 in sealing relation therewith. It is seen that the shaft 48, adjustment nut 52 and cup member 50 are movable with respect to the gland nut 54 and upper housing 44 and as described below will be moved upon the introduction of air under pressure through the hollow shaft 48 and into contact with the diaphragm 45. In order to normally restrain the shaft 48 and cup member 50 against downward movement, a coil spring 58 is provided and is positioned within the cup member 50, encircling the shaft 48 and bearing against the upper end of the gland nut 54.

In order to introduce the operating air into the upper chamber 46, the hollow shaft is formed with a plurality of ports 60 at the lower end thereof which communicate with the chamber 46 and are thus adapted to supply the operating air thereto. Defining the lower end of the chamber 46 is the diaphragm 45, the outer edge of which is disposed between the upper housing 44 and the central housing 40, thereby securing the diaphragm in position. The diaphragm 45 is mounted between reinforcing discs 64 and 66 through which extend a lower threaded portion 68 of the shaft 48. The discs 64, 66 are positioned between a shoulder 67 formed on the lower end of the hollow shaft 48 and an upper face 69 of a square-shaped upper end 70 of a valve stem 72. The upper end 70 of the valve stem 72 threadably receives the threaded portion 68 of the shaft 48 and thus is operatively secured to the shaft 48 and diaphragm 45. As shown in Fig. 5, the square-shaped upper end 70 of the valve stem 72 extends through a square opening 74 formed in a partition 76 which separates the valve chamber 41 from a lower diaphragm chamber 43 which extends from the partition 76 to the diaphragm 45. A plurality of minute gas openings 71 is provided in the partition 76 for connecting the valve chamber 41 with the lower diaphragm chamber 43. The gas openings 71 may be located in a circular pattern as illustrated in Fig. 4. Along the lower surface of the partition 76 covering the gas openings is located a screen grid 73 held in place by a suitable gasket and washer assembly received on the upper end 70 of the valve stem 72 which is secured to the partition 76 by bolts 78. Joined to the central housing 40 is a tube 79 that defines a bead inlet port 80 communicating with the dispensing chamber 41. The tube 79 is secured to the flexible conduit 34 and thus communicates with the glass bead reservoir 20. It is seen that pressurized glass beads are continuously fed to the valve chmber 41 through the conduit 34 and tube 79 and the valve chamber 41 is maintained full when the valve 82 is closed.

The air under the lower pressure of 5 to 15 p.s.i. in the valve chamber 41 filters through the glass beads, screen grid 73 and the gas openings 71 into the lower diaphragm chamber 43 to equalize the internal pressure in the valve chamber 41 and the lower diaphragm chamber 43.

In order to control the flow of the glass beads through the bead conduit 34 and tube 79 and into the dispensing chamber 41, a frusto conical distributing valve 82 is provided and is threadedly secured to the valve stem 72. The distributing valve 82 is normally urged into sealing engagement with a grommet 84 that is secured to an adjustment plate 86. The grommet opening provides an inlet for the glass beads for distribution about the conical valve 82. The adjustment plate 86 is secured to the housing 40 by bolts 90 that extend through enlarged openings 91 formed in the plate 86. In order to laterally shift the grommet carrying adjustment plate 86, an adjustment nut 92 threadably engaging a threaded opening 93 is provided, which opening is formed in the body of the housing 40.

It is seen that that upon movement of the diaphragm 45 in response to the high pressure of air thereon, the distributing valve 82 will be forced downwardly out of engagement with the grommet 84, thereby providing for flow of the glass beads about the conical valve 82. The conical shape of the valve 82 causes the small glass beads to fall outwardly and to be evenly distributed onto the surface being marked.

In operation of the bead dispenser embodied herein, the shaft 48 is secured to the higher air pressure conduit 36 for controlling the operation of the diaphragm valve through the action of three-way valve 29, and the glass bead inlet tube 79 is secured to the flexible conduit 34 for receiving the glass beads therein. The glass beads under pressure flow through the conduit 34 and tube 79 into the dispensing chamber 41 with the air pressure equalizing itself in the sphere reservoir 20, conduit 34, valve chamber 41 and lower diaphragm chamber 43. In the striping operation, the operator of the striping machine controls the three-way valve 29 operatively connected to the higher air pressure supply line that provides for the introduction of high pressure air through the air conduit 36 and into the hollow shaft 48. The air under pressure considerably higher than that in the lower diaphragm chamber 43 then forces the diaphragm 45 downwardly against the action of the spring 58, moving the conical distributing valve 82 out of engagement with the grommet 84 to allow the beads to drop through the opening in the grommet and strike the conical surface of the distributing valve. The beads are deflected outwardly, being uniformly distributed on the freshly painted stripe applied by the paint gun 24.

When the dispensing of the beads is to cease, the operator of the machine operates the three-way valve 29 to exhaust the high pressure air from the upper diaphragm chamber 46 through the hollow shaft 48 and the air line 36 through the valve 29. The action of the spring 58 and the pressure of the low pressure air in the lower diaphragm chamber 43 combine to pull the conical valve 82 upward against the grommet 84. The air pressure in the lower diaphragm chamber 43 and in the valve chamber 41 being equalized due to the gas openings 71, equalizes the internal pressure against the lower surface of the diaphragm 45 and the exposed surface of the conical valve 82. The exposed surface of the diaphragm 45 has a greater area than the exposed surface of the conical valve 82 and therefore the total force against the diaphragm exceeds the total force against the exposed surface of the valve, thereby holding the valve shut.

It is seen that by providing a pressurized source of glass beads, the bead dispenser and the glass bead reservoir may be positioned in striping machines wherever it is desirable. The reservoir need not be in close proximity to the bead dispenser as heretofore, directly thereover, but can be connected by sloping or even horizontal conduits. The diaphragm provides a very close control of the distributing valve 82 and is responsive to the application of air thereto to cause instantaneous movement of the distributing valve 82. The air used for operation of the diaphragm can be taken directly from the main air supply line of the machine. The air for pressurizing the glass spheres is of a lower pressure than the main air supply line. This air should be filtered through the air filter 33 so as to eliminate any moisture therefrom that might cause agglomeration of the beads. By use of the coil spring 58 in combination with the air pressure of the beads, the distributing valve 82 is normally retained in a closed position and will be biased to the closed position when the air pressure on the diaphragm 45 is removed. The tension on the coil spring may be easily varied by the cup member 50, thereby varying the movement of the distributing valve. The limit of movement of the distributing valve is then determined by the position of the cup member with respect to the upper housing. By providing a close control of the movement of the valve, an even distribution of the beads is effected.

It is seen that the striping apparatus using the above-described bead dispenser may be propelled at various speeds depending upon the speed of operation demanded by the striping conditions and the glass beads will always be uniformly distributed on the surface being marked.

It will be obvious to those skilled in the art that various changes may be made without departing from the spirit of the invention and therefore the invention is not limited to what is shown in the drawings and described in the specification but only as indicated in the appended claims.

What is claimed is:

1. In a dispenser for small glass spheres, a source of glass spheres subjected to a gas under a relatively low pressure yet greater than atmospheric, a source of gas pressure under a relatively high pressure, a valve chamber, a valve arranged in said chamber, a diaphragm chamber, a diaphragm arranged within said diaphragm chamber separating said diaphragm chamber into two portions, said diaphragm being connected to said valve and adapted to control the position of said valve by movement of said diaphragm, a first means connecting said valve chamber and said source of spheres, whereby said valve chamber is maintained full of glass spheres subjected to said gas under a relatively low pressure when said valve is closed, a second means permitting the passage of the low pressure gas from said valve chamber to one portion of the diaphragm chamber, a third means connecting the other portion of said diaphragm chamber with said source of higher gas pressure, and a second valve arranged in said third means, whereby the control of the operation of said second valve results in the operation of said first mentioned valve through said diaphragm to dispense controlled amounts of said glass spheres from said valve chamber.

2. In a dispenser in accordance with claim 1, wherein said second means comprises a partition separating said valve chamber from the one portion of said diaphragm chamber, a plurality of minute gas openings through said partition, and a screen grid located adjacent to and in contact with said partition in said valve chamber covering said gas openings, said grid being so constructed as to permit the flow of gas therethrough from said valve chamber to said gas openings and to the one portion of said diaphragm chamber while preventing the passage of said glass spheres therethrough.

3. In a diaphragm actuated valve arrangement for dispensing small solid particles comprising a valve, a valve chamber and a diaphragm chamber containing a diaphragm therein separating said diaphragm chamber into an upper and a lower portion, said diaphragm being connected to said valve and adapted to control the position of said valve by movement of said diaphragm, a first source of gas pressure of a relatively high pressure, a second source of gas pressure of a relatively low pressure yet greater than atmospheric, a first means for connecting said first source of gas pressure to the upper side of said diaphragm when it is desired to open said valve, a container containing a supply of said particles, a second means for connecting said second source of gas pressure to said container, a third means for connecting said container to said valve chamber, and a plurality of minute gas openings between the lower portion of said diaphragm chamber and said valve chamber whereby when said valve is closed said valve chamber is maintained full of said particles and is under pressure of the lower gas pressure, the lower portion of said diaphragm chamber being likewise maintained under the same gas pressure so that when said valve is open due to the higher gas pressure acting on the upper side of said diaphragm, said particles are dispensed from said valve chamber.

4. In an arrangement in accordance with claim 3, a partition separating said valve chamber from said lower portion of said diaphragm chamber, said gas openings being located in said partition, and a screen grid located adjacent to and in contact with said partition in said valve chamber covering said gas openings, said grid being so constructed as to permit the flow of gas therethrough to said gas openings and to the lower portion of said diaphragm chamber and prevent the passage of said solid particles.

5. In a highway marking machine for distributing reflective glass beads upon a surface, a housing having a partition therein forming a valve chamber and a diaphragm chamber, a plurality of gas openings through said partition, a diaphragm disposed in said diaphragm chamber, the upper surface of said diaphragm communicating with a source of higher gas pressure, means for controlling the passage of said higher gas pressure to the upper surface of said diaphragm, a valve stem secured to said diaphragm and extending through said valve chamber, said valve chamber having a glass bead inlet and a source of relatively lower air pressure but greater than atmospheric communicating therewith, whereby said valve chamber and the lower surface of said diaphragm are subjected to said lower gas pressure, a conical valve secured to said valve stem and being normally seated in said opening, said valve closing off communication between said valve chamber and said opening, said lower gas pressure normally retaining said valve in a closed position in said opening, said diaphragm being movable in response to the action of the gas pressure from said higher gas pressure source on the upper surface of said diaphragm thereby moving said valve out of engagement with the seat thereof to allow said glass beads to flow from said valve chamber through said opening.

6. In a machine in accordance with claim 5, wherein a screen grid is located in said valve chamber against said partition for preventing the flow of glass beads through said gas openings yet permitting the flow of gas therethrough.

7. In road striping apparatus for dispensing small glass spheres onto a freshly applied paint line, a housing, a lower chamber formed in said housing and adapted to receive said glass spheres therein, an upper chamber formed in said housing having a diaphragm secured therein to define upper and lower compartments, a sphere outlet communicating with said lower chamber, a valve disposed in said outlet and extending into said lower chamber, a valve stem joined to said valve and to said diaphragm, said valve thereby being responsive to movement of said diaphragm, means for introducing air under pressure into said upper compartment and into contact with the upper surface of said diaphragm, a source of said spheres located remote from said housing, conduit means interconnecting said sphere source and the lower chamber of said housing, means for introducing air under pressure into said sphere source for rapidly moving said spheres into the lower chamber of said housing, said lower chamber being pressurized by the air flowing through said sphere source when said valve is closed so that when air is introduced into said upper compartment and said diaphragm is flexed to open said valve, said spheres are discharged through said outlet in a pressurized stream.

8. In a highway marking machine as set forth in claim 7, which includes a partition located between said lower chamber and said upper chamber, a plurality of small passages formed in said partition, said passages providing communication between said lower chamber and the lower compartment of said upper chamber, said air introduced into said upper compartment of the upper chamber being at a higher pressure than said air pressurizing said lower chamber.

9. In a highway marking machine for dispensing glass spheres onto a surface, a housing having a valve chamber and a diaphragm chamber formed therein in coaxial relation to each other, a diaphragm disposed in said diaphragm chamber, an outlet formed in said valve chamber, a valve positioned in said outlet, a valve stem interconnecting said diaphragm and valve, said valve thereby being responsive to movement of said diaphragm, a source of said glass spheres located remote from said housing, a conduit interconnecting said source and said valve chamber, said source being subjected to air under pressure whereby said glass spheres are conveyed by air under pressure into said valve chamber and maintained in a suspended state therein, means for introducing air under pressure to the upper surface of said diaphragm for causing flexing thereof, said valve thereby being moved to an open position to cause said spheres to be discharged through said outlet in a pressurized stream.

10. In a highway marking machine as set forth in claim 9 which includes a partition located between said diaphragm chamber and said valve chamber, a plurality of small passages formed in said partition, said passages providing communication between said valve chamber and the under surface of said diaphragm, said air for actuating said diaphragm being at a higher pressure than said air for conveying said spheres into said valve chamber.

11. In a highway marking machine for dispensing glass spheres onto a surface, a housing, a valve chamber formed in the lower portion of said housing, a diaphragm chamber formed in the upper portion of said housing and located in coaxial relation with said valve chamber, a valve located in said valve chamber, a diaphragm secured in said diaphragm chamber and operatively interconnected to said valve for causing movement thereof, a source of said glass spheres located remote from said housing, means interconnecting said sphere source to said housing, means for introducing air under pressure to said sphere source, said air under pressure acting as a carrying agent for conveying said spheres into said valve chamber in a suspended state, and means for introducing air under pressure in contact with said diaphragm for moving said valve to an open position, said spheres being discharged from said valve chamber in a pressurized stream.

12. In a highway marking machine as set forth in claim 11, wherein said air for actuating said diaphragm is at a higher pressure than said air for conveying said spheres from said sphere source to said valve chamber.

13. In a highway marking machine as set forth in claim 12 which includes a partition located between said diaphragm chamber and said valve chamber, a plurality of small passages formed in said partition, said passages providing communication between said valve chamber and the undersurface of said diaphragm, said diaphragm thereby being prevented from opening said valve when the sphere dispensing operation has been discontinued.

14. In a highway marking machine as set forth in claim 13 which includes a screen grid located in said valve chamber and adjacent said openings, said screen grid providing access of said air in said valve chamber for conveying the spheres through said openings and preventing the passage of said spheres therethrough.

References Cited in the file of this patent
UNITED STATES PATENTS

| | | |
|---|---|---|
| 571,833 | Hunter | Nov. 24, 1896 |
| 1,752,956 | Lex | Apr. 1, 1930 |
| 2,376,018 | Sohmer | May 15, 1945 |
| 2,691,923 | Huck | Oct. 19, 1954 |
| 2,756,103 | Creswell | July 24, 1956 |